(12) United States Patent
Burgoon et al.

(10) Patent No.: US 6,267,210 B1
(45) Date of Patent: Jul. 31, 2001

(54) BRAKE HUB WITH FLOATING ROTOR

(75) Inventors: Donald L. Burgoon, Gastonia, NC (US); Wenqi Qian, Fort Mill, SC (US); Sean E. Killeen, Charlotte, NC (US)

(73) Assignee: Performance Friction Corporation, Clover, SC (US)

( * ) Notice: Subject to any disclaimer, the term of this patent is extended or adjusted under 35 U.S.C. 154(b) by 0 days.

(21) Appl. No.: 09/557,647

(22) Filed: Apr. 26, 2000

Related U.S. Application Data
(60) Provisional application No. 60/191,905, filed on Mar. 24, 2000.

(51) Int. Cl.[7] .................................................... F16D 65/12
(52) U.S. Cl. .................................................... 188/218 XL
(58) Field of Search ........................... 188/18 A, 218 A, 188/218 R, 218 XL (56) References Cited

U.S. PATENT DOCUMENTS

| | | | |
|---|---|---|---|
| 5,190,124 | * | 3/1993 | Haneda ........................ 188/218 XL |
| 5,520,269 | * | 5/1996 | Yamamoto et al. ........... 188/218 XL |
| 5,788,026 | * | 8/1998 | Poli .............................. 188/218 XL |
| 6,098,764 | * | 8/2000 | Wirth et al. .................... 188/218 XL |

* cited by examiner

*Primary Examiner*—Christopher P. Schwartz
(74) *Attorney, Agent, or Firm*—Pillsbury Winthrop LLP (57) ABSTRACT

A hub rotor assembly includes a hub, a rotor supported by the hub and a plurality of fasteners that connect the rotor to the hub and allow relative movement between the rotor and the hub. The hub rotor assembly of the invention focuses on a brake hub and rotor assembly that uses a floatation element associated with a fastener to fasten the rotor to the hub while allowing the rotor to move or float relative to the hub. The rotor thus fastened is permitted to move or float in a limited manner with respect to the hub. This reduces the need for precise balancing due to float self-balancing. Such floatation reduces first and second order thermal distortion by allowing the rotor to thermally expand and also accommodates and significantly reduces the temperature variation and thermal distortion across the rotor surface during braking. The assembly is particularly suited for commercial highway vehicles.

23 Claims, 9 Drawing Sheets

BRAKE HUB WITH FLOATING ROTOR

This appln claims the benefit of Provisional No. 60/191,905 filed Mar. 24, 2000.

BACKGROUND OF THE INVENTION

1. Field of Invention

This invention relates to a brake assembly including a hub and rotor. The brake assembly is particularly suited for application in a commercial vehicle.

2. Description of Related Art

Prior brake designs use a rotor fixed to a brake hub with fasteners or an integrated hub and rotor design. However, as the rotor is conventionally fixed with respect to the hub, the rotor must be carefully balanced to avoid uneven wear and compromised performance. Also, during braking, the rotor in such an assembly is subjected to high frictional forces that generate heat in the rotor causing thermal expansion/distortion, temperature variation across the face of the rotor, and heat transfer to the adjacent components including the hub and the fasteners. This is especially apparent in an integrated hub and rotor design.

When the rotor is fixed with respect to the hub, thermal expansion of the rotor is very limited because of the integral connection between the rotor and the hub. This creates thermal coning in the rotor surface and a large thermal gradient, which will induce high thermal stress leading to thermal cracking. The high thermal gradient generated during braking and the effects of the thermal expansion/distortion can cause vibration and thermal judder across the brake surfaces, resulting in a rough or irregular braking sensation. The high thermal stress and thermal distortion also reduce the life and performance of the rotor and increase maintenance costs.

Figure 13:
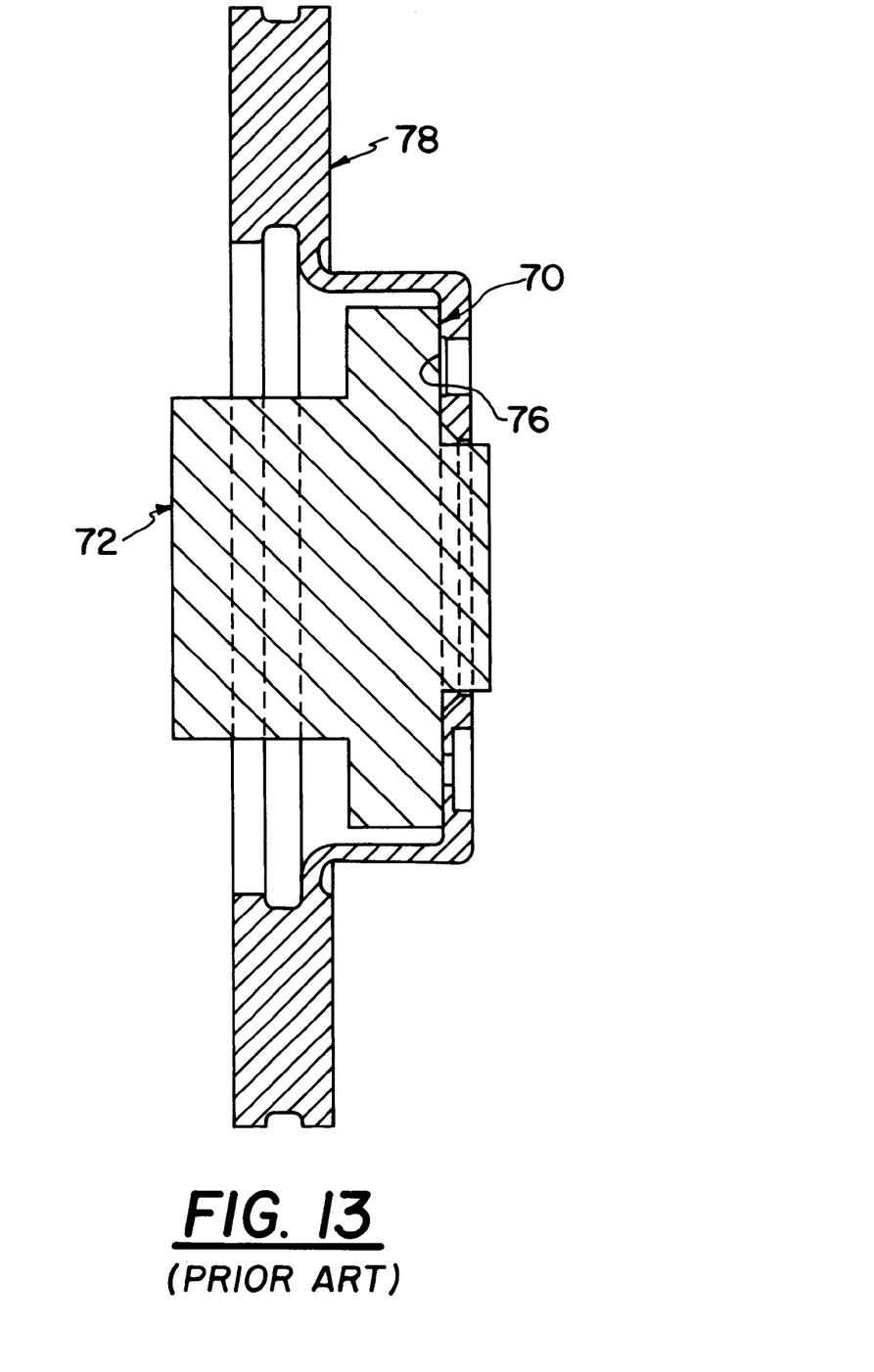
FIG. 13 is a side view in section of a prior art hat rotor and hub assembly.

Another problem associated with rotors connected to a hub, for example, a hat rotor that bolts onto a hub, is compound run-out. Referring to FIG. 13, this phenomenon is caused when a rotor surface 76, which is not perfectly flat or parallel due to inherent imperfections created during manufacturing, is connected to a hub 72, and the axes of rotation of the rotor 78 and the hub 72 are not in precise alignment. The potential run-out area in FIG. 13 is shown at 70. Misalignment results in poor rotor performance and durability.

Particularly in commercial braking applications, braking performance is especially stringent and closely monitored. It is important in such applications to provide a braking assembly that provides enhanced performance at low maintenance and replacement costs.

SUMMARY OF THE INVENTION

One aspect of the embodiments of the invention is to provide a braking assembly that is suitable for use on commercial vehicles, especially highway vehicles with a gross vehicle weight (GRW) of 5000 pounds or more and high performance vehicles.

Another aspect of the embodiments of the invention is to provide a rotor that floats with respect to the hub. This reduces the need for precise balancing due to float self balancing.

An additional aspect of the embodiments of the invention is to reduce first and second order thermal distortion by allowing the rotor to thermally expand. Embodiments of the invention provide a design that significantly reduces the temperature variation and thermal distortion across the rotor surface. This design can reduce thermal fatigue and prolong the life of the rotor.

The invention uses a floatation element with each fastener to allow the rotor to float or move with respect to the hub. The element can be made of a material resistant to corrosion and having low thermal conductivity so as to be viable for commercial highway vehicles.

The invention can reduce vibration and thermal judder across brake surfaces to ensure a smooth pedal feel during automobile or other vehicle braking applications.

A further aspect of the embodiments of the invention is to eliminate the compound run-out that is associated with the hub in a traditional integrated hub design.

Embodiments of the invention allow the rotor components to be family parts to reduce manufacturing tooling costs. The casting process can also be simplified, thus lowering costs and allowing improved quality control of castings.

Lower maintenance costs can be realized by tis invention by allowing replacement of the rotor without a hub change. Additionally, the hub and rotor can have different material specifications for optimal cost and performance.

These and other aspects and advantages of the invention can be realized by the various embodiments of the hub rotor assembly of the invention, which focuses on a brake hub and rotor assembly that uses a floatation element associated with a fastener to fasten the rotor to the hub while allowing the rotor to float relative to the hub. The rotor thus fastened is permitted to move in a limited manner with respect to the hub.

Other objects, aspects, and advantages of the embodiments of the invention will become apparent from the detailed description taken in conjunction with the drawings.

BRIEF DESCRIPTION OF THE DRAWINGS

Referring to the drawings that form part of this disclosure.

DETAILED DESCRIPTION OF PREFERRED EMBODIMENTS

In the description below, reference numerals for the same elements remain the same in each figure.

Figure 1:
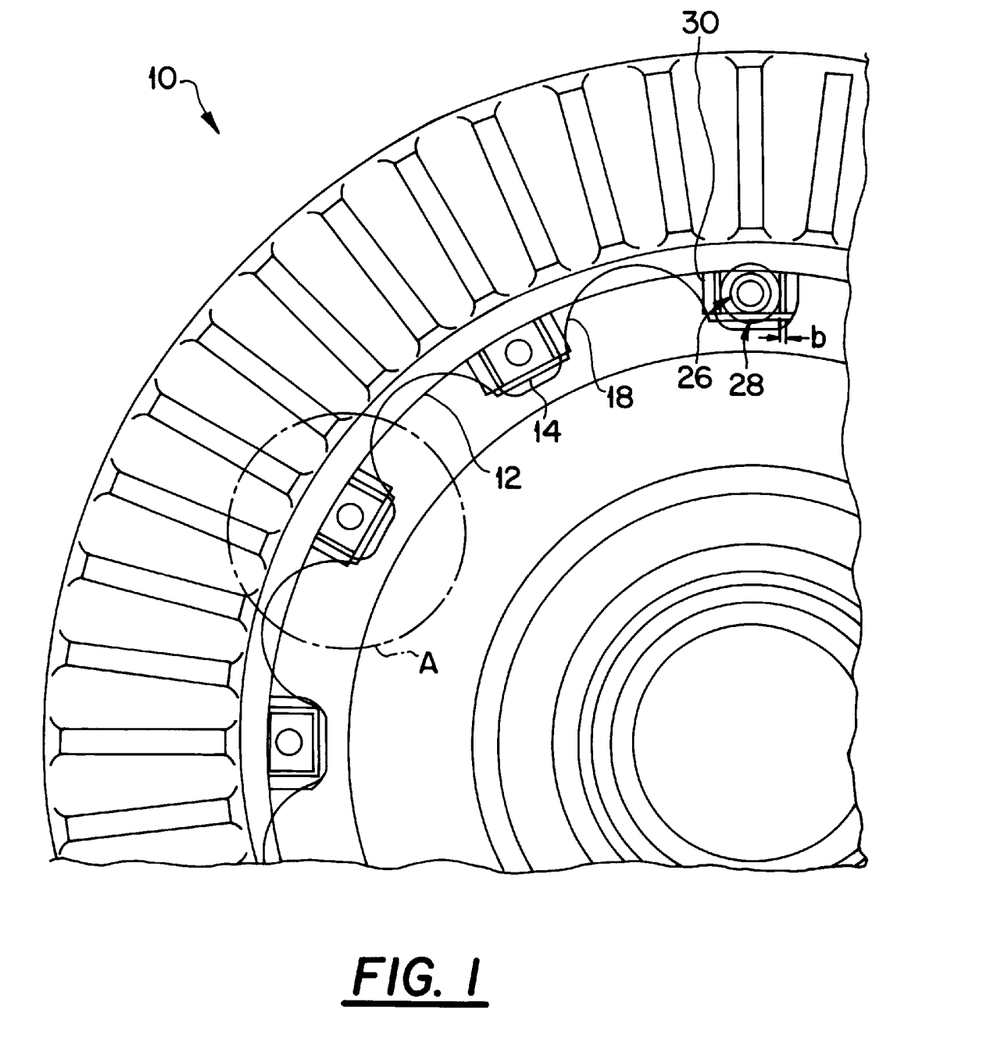
FIG. 1 is partial front view of a brake rotor and hub assembly in accordance with the invention.
Figure 2:
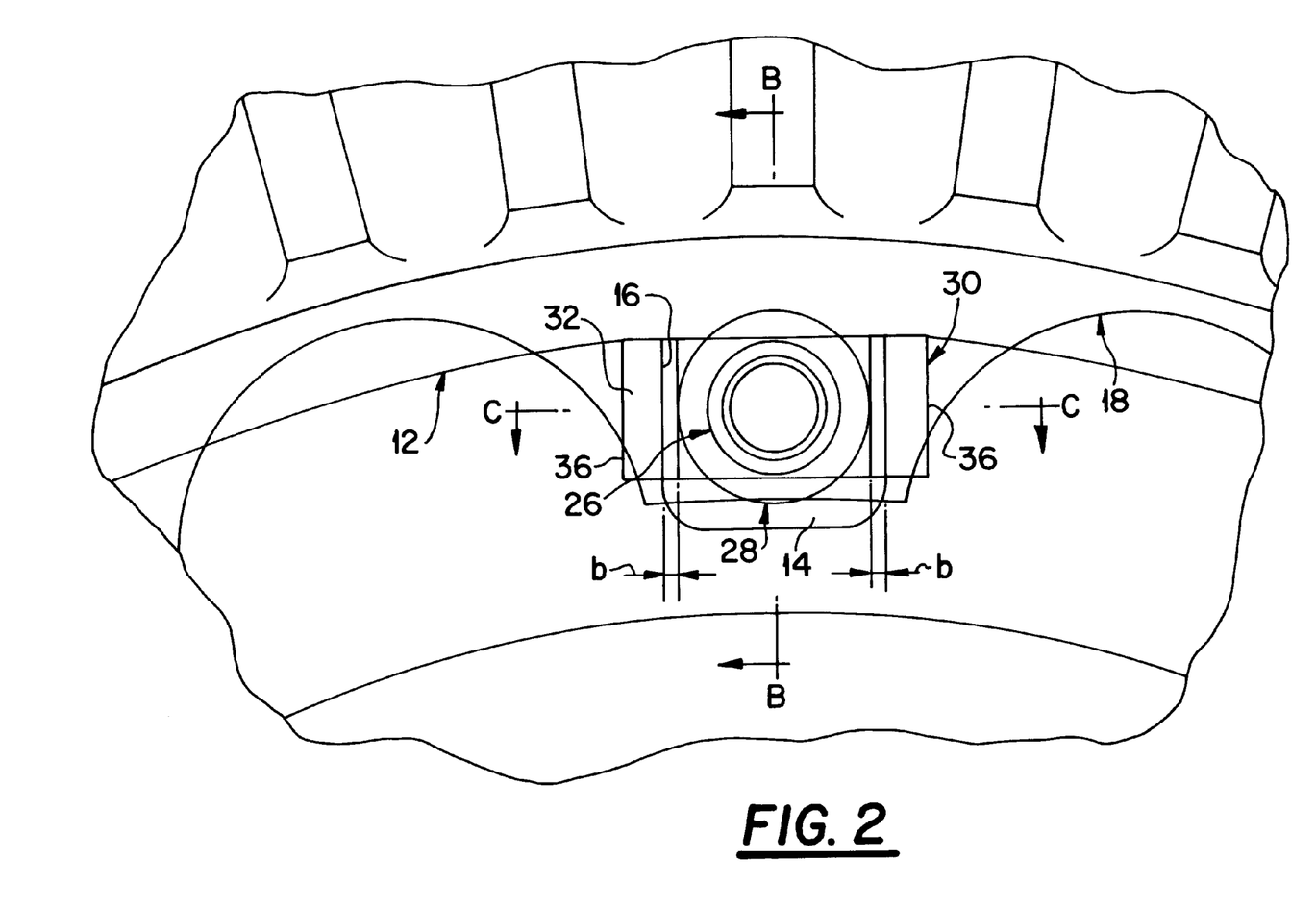
FIG. 2, is an enlarged view of a portion of FIG. 1 shown in circle A showing the details of the fastener assembly.

As seen in FIGS. 1 and 2, assembly 10 includes a hub 12, also referred to as a hat, that has a flange 14. Flange 14 has a plurality of slots 16 formed therein. Each slot is generally square shaped and opens outwardly with respect to the axis of rotation of hub 12. The slot can, of course, be any shape suitable for receiving a fastener.

The hub can be made of any conventional material, and is preferably made of cast iron, classes GG 20–40, depending on the desired application and cost considerations.

Figure 3:
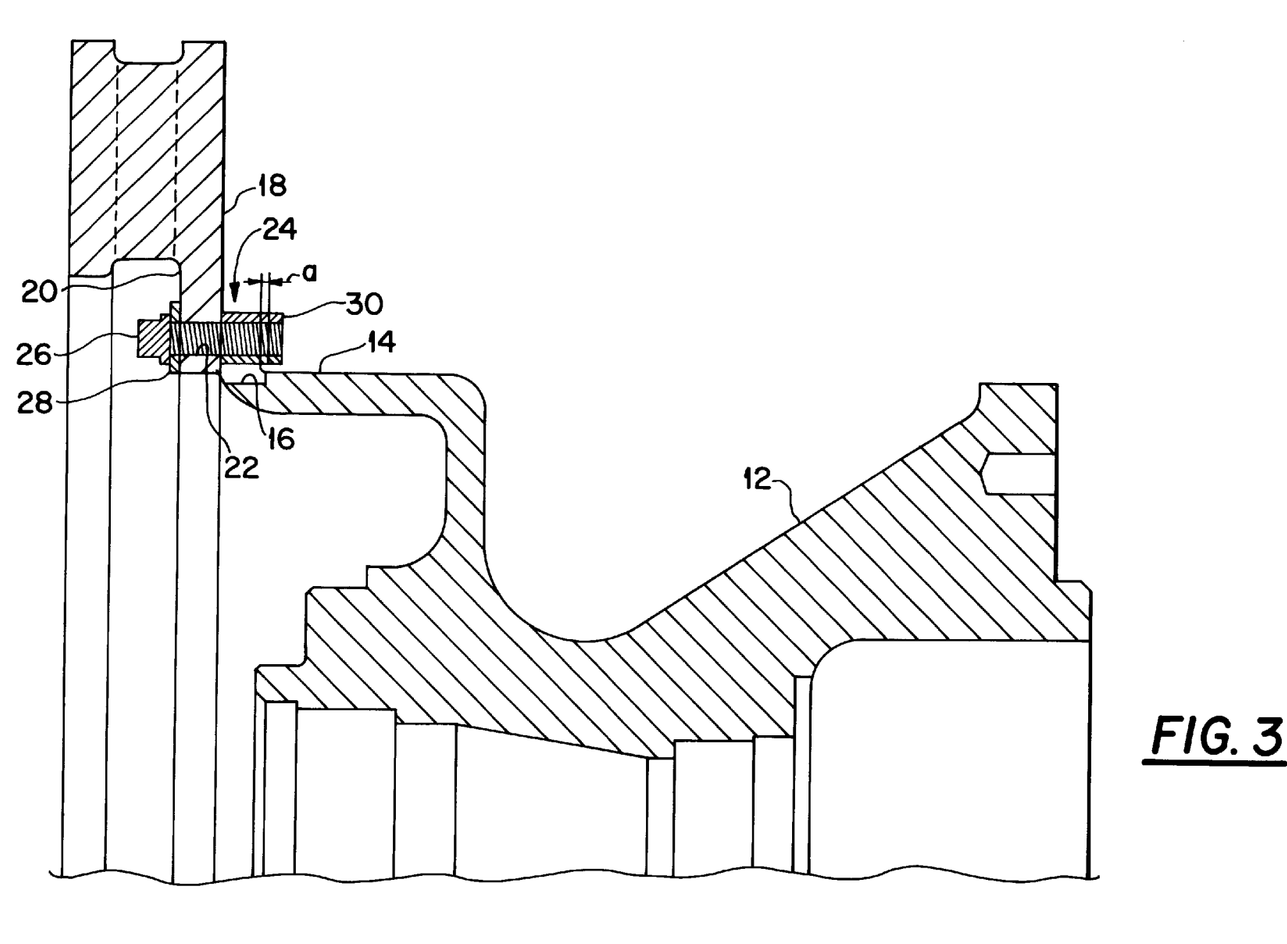
FIG. 3 is a partial side view in section of the rotor and hub assembly fastened together taken along line B—B in FIG. 2.

A rotor 18 having a generally annular shape is fastened to hub 12. Rotor 18 can be of any known form used for braking. As shown in FIG. 3, rotor 18 has flange 20 that confronts hub flange 14. Flange 20 has a plurality of openings 22 therein for receiving fasteners. Rotor 18 is connected to hub 12 such that the axis of rotation of rotor 18 is aligned with, or the same as, the axis of rotation of hub 12.

The rotor can be made of any conventional material, and is preferably made of cast iron with an alloy that can increase thermal performance, depending on the desired application and wear and cost considerations.

Rotor 18 is connected to hub 12 by a fastener assembly 24. Fastener assembly 24 includes a threaded bolt 26, a washer 28 and a floatation element 30. Floatation element 30 is preferably a bobbin having a polygonal head 32, shown in FIG. 2 for example as a rectangle, and a hollow, internally threaded polygonal body 34. Of course, body 34 can be any desired shape, but preferably the external shape complements the opening in hub 12 or rotor 18 in which bobbin 30 is retained. Body 34 can also have a through-hole with no threading, in which case a nut would be employed to retain bolt 26, as described below. Head 32 is integrally attached to body 34 and extends past body 34 on each side with outwardly extending flanges 36. Any suitable number of fastener assemblies 24 can be used, often depending on the size of the rotor and the particular application.

Figure 4:
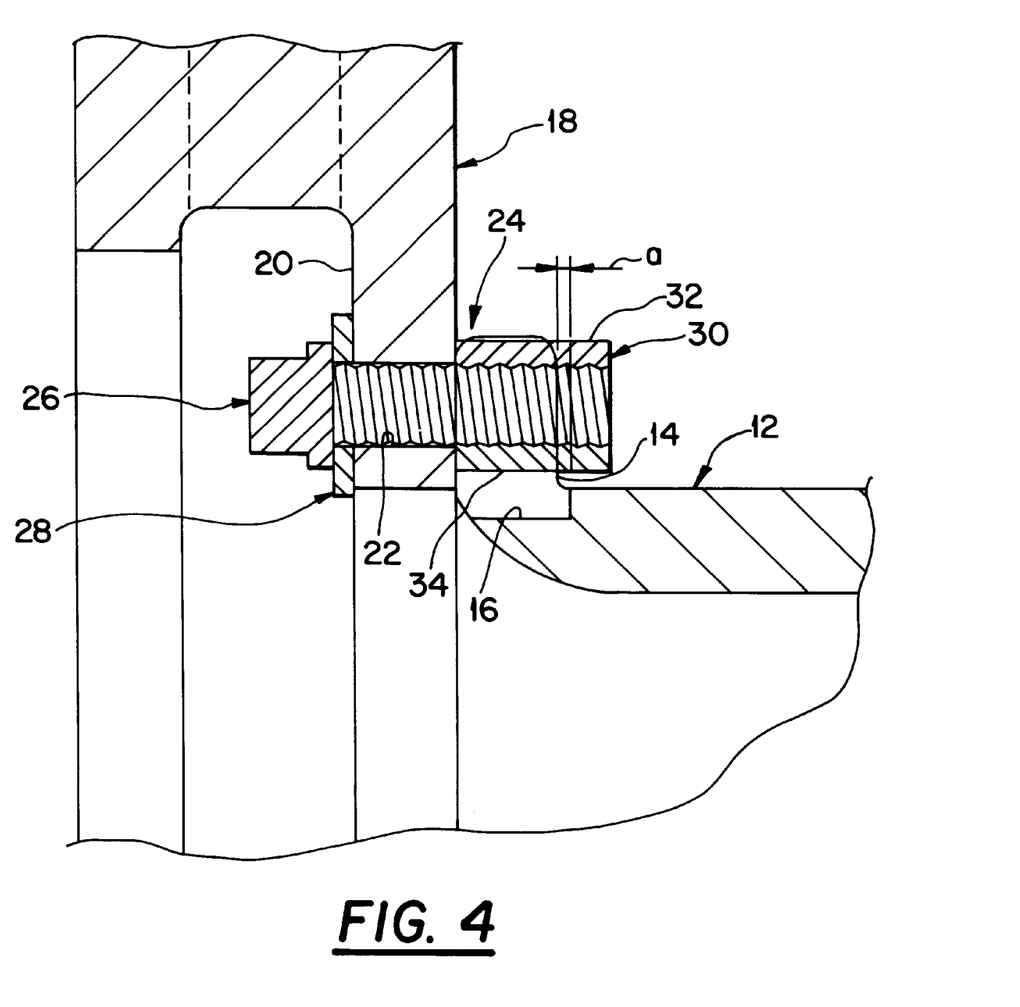
FIG. 4 is an enlarged view of the fastener assembly of FIG. 3.

In the embodiments shown in FIGS. 5–8, bobbin 30 is preferably sized such that bolt 26 does not extend from bobbin body 34 when assembled. Bobbin head 32 is sized to extend beyond the edges of slot 16 to prevent bolt 26 from becoming disengaged with rotor 18 and hub 12. Bobbin body 34 is sized to have a greater length than the width of hub flange 14, thus creating a floating clearance "a" clearly shown in FIGS. 4 and 5. Floating clearance "a" can be any distance that accommodates thermal expansion/distortion of rotor 18, and is preferably about 0.003 to 0.009 inches. Bobbin body also has a width that is less than the width of the slot 16, thus creating a floating clearance "b" clearly shown in FIGS. 2 and 5. The floating clearance "b" is shown as being divided into separate clearances on either side of bobbin body 34, but may occur on either or both sides in equal or unequal divisions. Both of these clearances are added to obtain the total clearance "b". The total floating clearance "b" can be any distance that accommodates thermal expansion/distortion of rotor 18, and is preferably about 0.002 to 0.014 inches.

Bobbin 30 can be made of any material suitable for commercial braking applications, and preferably has a low rate of thermal transfer and is corrosion resistant, such as stainless steel.

Figure 5:
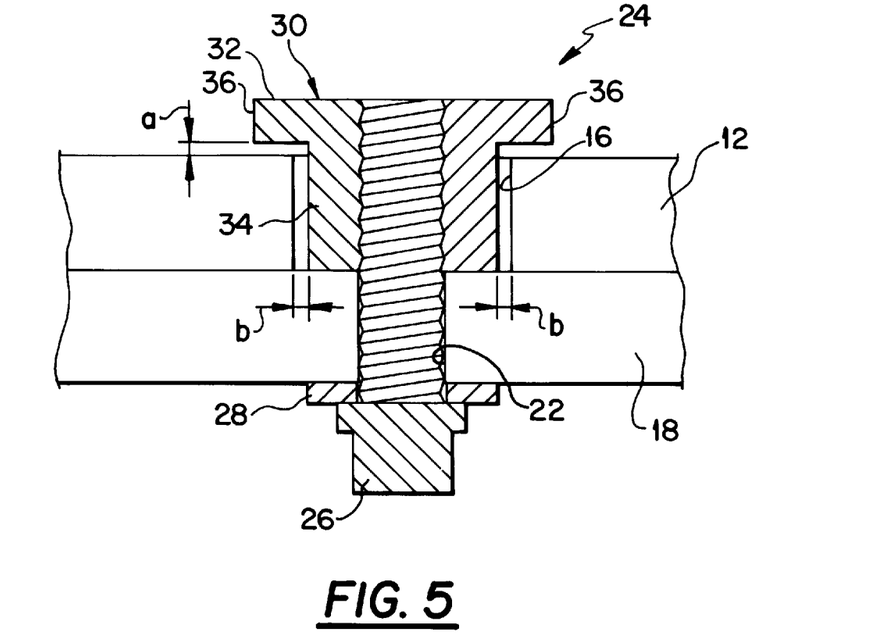
FIG. 5 is an enlarged back view in section of the fastener assembly of FIG. 1 taken along line C—C in FIG. 2.
Figure 6:
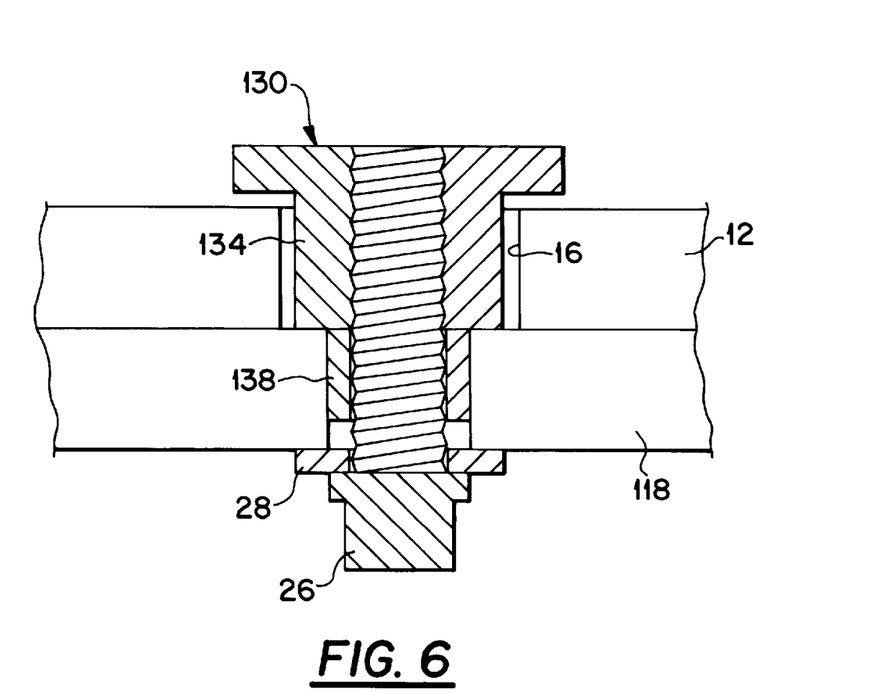
FIG. 6 is an enlarged back view in section of a modification of the invention in which the fastener assembly uses a cylindrical bushing.

In FIG. 5, bobbin 30 is shown as being retained in slot 16 of hub 12. FIG. 6 shows a modification of the fastener assembly of FIG. 5.

As best shown in FIG. 6, bobbin 130 has an integral cylindrical bushing 138 extending from body 134. By this, bobbin 130 extends into hub 12. Such a bushing ensures a precise connection between the rotor 118 and the hub 12, which can be difficult to obtain with conventional bolts that can vary slightly in size. It is also possible to use a bobbin that extends through both the rotor and the hub creating an entire floating connection in which clearance is provided adjacent both the rotor and the hub, if desired.

Figure 7:
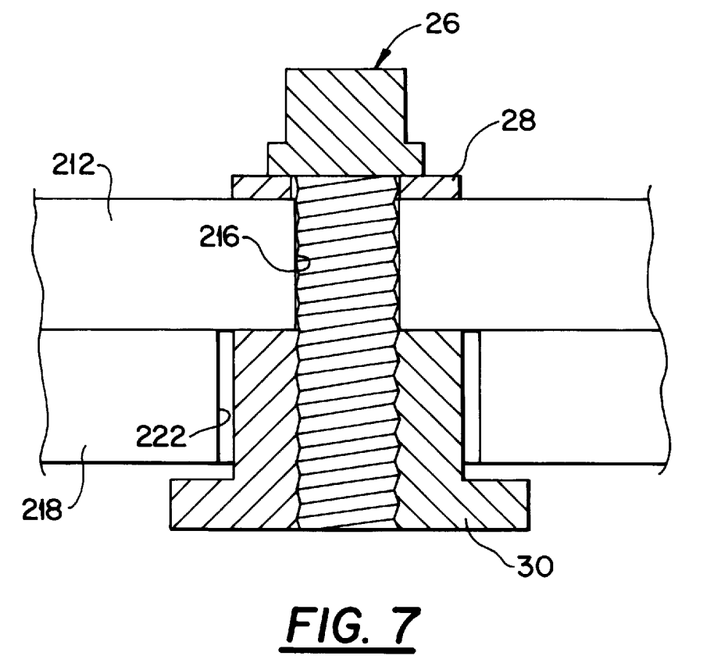
FIG. 7 is an enlarged back view in section of another embodiment of the fastener assembly.

FIG. 7 illustrates an alternative embodiment of the fastener assembly. Bobbin 30 is shown as being retained in slot 222 of rotor 218, rather than in slot 16 of hub 12 as in the previous embodiment. The fastener is attached in the same manner with a bolt 26 extending through slot 216 in hub 212 and engaging with bobbin 30.

Figure 8:
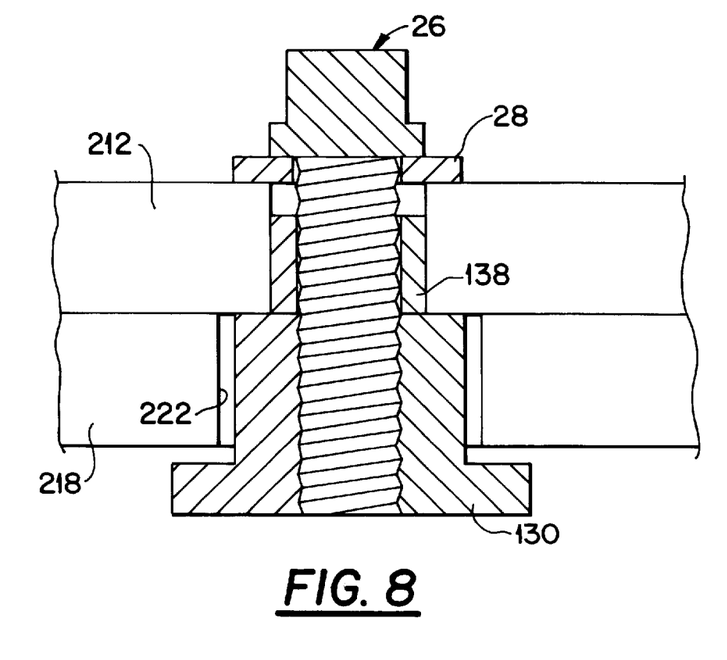
FIG. 8 is an enlarged back view in section of a modification of the embodiment of the fastener assembly shown in FIG. 7 with a cylindrical bushing.

FIG. 8 shows bobbin 130 being retained in slot 222 of rotor 218. Bobbin 130 has an integral cylindrical bushing 138, similar to the bobbin 130 of FIG. 6. Bobbin 130 extends into hub 212 by way of cylindrical bushing 138. Such a bushing ensures a precise connection between rotor 218 and hub 212.

Figure 9:
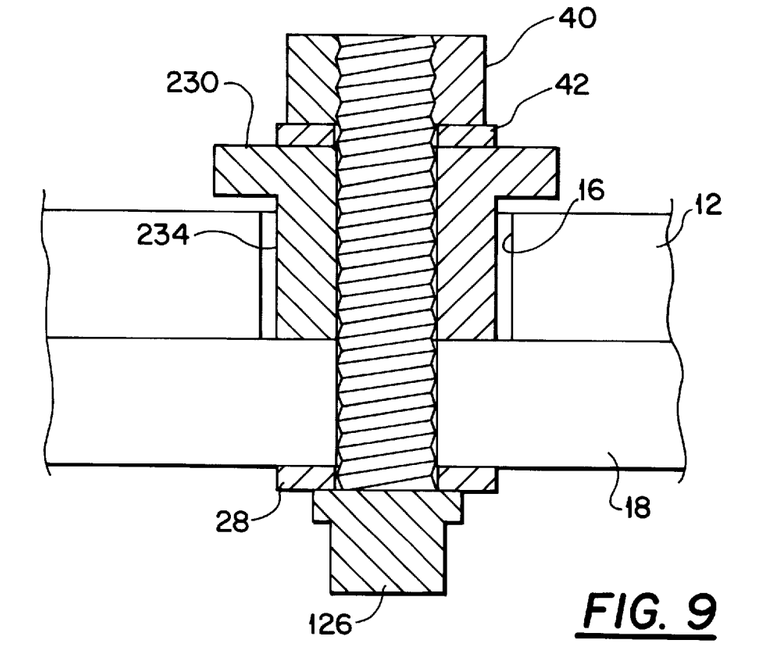
FIG. 9 is an enlarged back view in section of a further embodiment of the fastener assembly with a nut.

FIG. 9 illustrates another embodiment of the fastener assembly. Bobbin 230 is retained in slot 16 of hub 12. In this case, bobbin 230 has a smooth central bore with no threads and bolt 126 is larger than bolt 26 in the prior embodiments. Body 234 has a through-hole with no threading such that a nut 40 is employed to retain bolt 126. Bolt 126 enters rotor 18 with the bolt head 126 positioned on the rotor side. Bolt 126 extends beyond the hub 12 and is secured with a nut 40 and washer 42.

Figure 10:
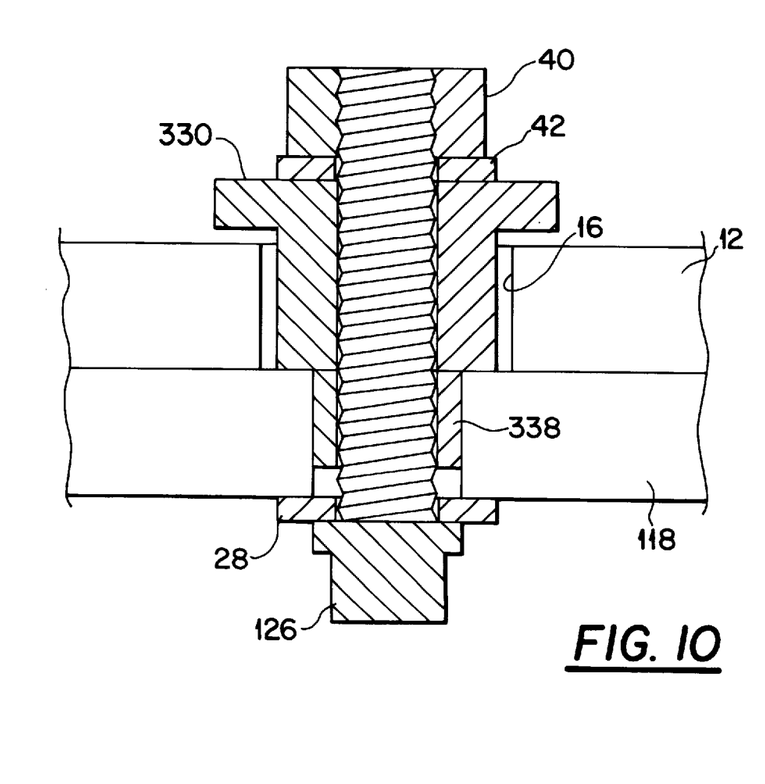
FIG. 10 is an elarged back view in section of a modification of the embodiment of FIG. 9 showing a cylindrical bushing.

FIG. 10 shows bobbin 330 having an integral cylindrical bushing 338, similar to the bobbin 130 of FIGS. 6 and 8. Bobbin 330 extends into rotor 118 by way of cylindrical bushing 338. Bolt 126 holds bobbin 330 in slot 16 of hub 12 when secured with nut 40 and washer 42.

Figure 11:
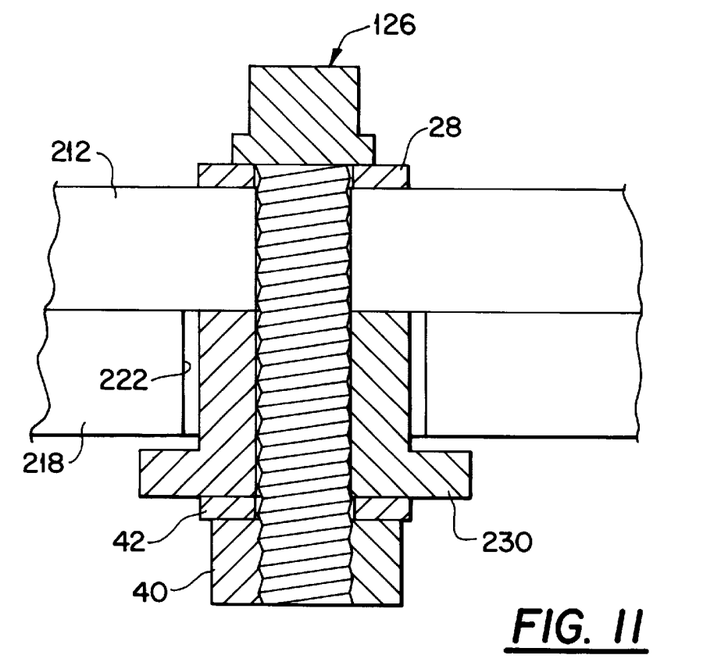
FIG. 11 is an enlarged back view in section of an additional embodiment of the fastener assembly with a nut.

FIG. 11 illustrates yet another embodiment of the fastener assembly. Bobbin 230 is retained in slot 222 of rotor 218. As described above, bobbin 230 has a smooth central bore with no threads and bolt 126 is larger than bolt 26 in the prior embodiments. Bolt 126 is shown as entering hub 212 with the bolt head positioned on the hub side. The bolt 126 is sized to extend beyond rotor 218 and is secured with nut 40 and washer 42.

Figure 12:
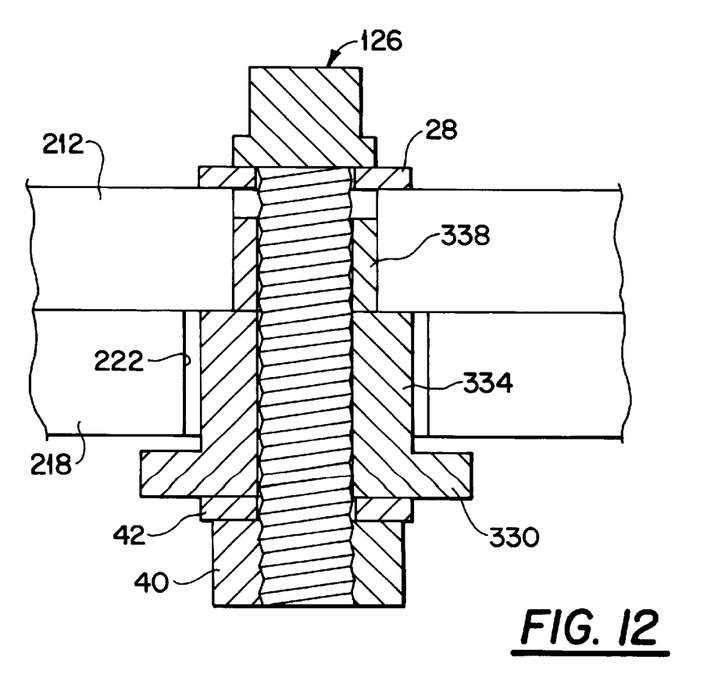
FIG. 12 is an enlarged back view in section of a modification of the fastener assembly of FIG. 11 with a cylindrical bushing.

FIG. 12 shows bobbin 330 extending into hub 212 by way of cylindrical bushing 338. Body 334 has a through-hole with no threading such that nut 40 is employed to retain bolt 126. Bolt 126 retains bobbin 330 in slot 222 of rotor 218 when secured with nut 40 and washer 42. As shown by the various embodiments, reversing insertion of the bolt may be particularly advantageous depending on the particular application to facilitate assembly and access.

Upon assembly, openings 22 in rotor flange 20 are aligned with slots 16 in hub flange 14. A bobbin 30 is inserted in either rotor opening 22 or hub slot 16. The flanges 36 of bobbin head 32 extend beyond the edges of the corresponding opening. A bolt 26, preferably, but not necessarily, with washer 28, is inserted through the aligned opening and slot, from the element opposed to the element that receives the bobbin. For example, when bobbin 30 is received in hub 12, as shown in FIG. 5, bolt 26 is first inserted through opening 22 in rotor 18. Bolt 26 is threaded into bobbin body 34 to securely attach rotor 18 to hub 12. Alternatively, as described above, bolt 26 is inserted through bobbin 230, for example, and retained by nut 40, and, if desired, washer 42.

During operation, rotor 18 rotates with hub 12. Upon braking, rotor 18 is permitted to slightly move with respect to hub 12 due to clearances "a" and "b". Movement can be due to thermal expansion/distortion or rotational torque. Rotor 18 can move to the left and right, as seen in FIG. 2, such movement being parallel to the axis of rotation. Rotor 18 can also move up and down, as seen in FIG. 5, such movement being perpendicular to the surface of the rotor. Rotor 18 does not move appreciably in the radial direction, thus the axis of rotation of rotor 18 remains aligned with the axis of rotation of hub 12. The movement allows the rotor to "float" with respect to the hub. This movement is present with each of the above described embodiments.

The design of the components, especially with respect to their interrelation and associated clearances, is optimized based on state of the art finite element analysis to enhance braking performance and increase the life of the hub and rotor. The design results in reduced vibrations and judder. Also, manufacturing tooling, rotor replacement and maintenance costs are reduced.

While advantageous emboddnents have been chosen to illustrate the invention, it will be understood by those skilled in the art that various changes and modifications can be made therein without departing from the scope of the invention.

What is claimed is:

1. A hub rotor assembly comprising:
   a hub;
   a rotor supported by the hub for rotation about a central axis; and
   a plurality of fasteners that connect the rotor to the hub and allow relative movement between the rotor and the hub in a radial direction and an axial direction with respect to the central axis.

2. The hub rotor assembly of claim 1, wherein each of the plurality of fasteners includes a bolt and a bobbin supported by one of the hub and the rotor, wherein the bolt is secured to the bobbin to connect the rotor to the hub.

3. The hub rotor assembly of claim 2, wherein the hub has a flange with a plurality of slots therein, the hub flange having a thickness, and each bobbin has a tubular portion having a length more than the thickness of the hub flange, wherein each bobbin is retained in a slot so that the bobbin can move relative to the corresponding slot in the axial direction.

4. The hub rotor assembly of claim 3, wherein each bobbin has an enlarged head connected to the tubular portion that extends beyond edges of the corresponding slot.

5. The hub rotor assembly of claim 2, wherein the rotor has a flange with a plurality of openings therein, the rotor having a thickness, and each bobbin has a tubular portion having a length greater than the thickness of the rotor flange, wherein each bobbin is retained in an opening so that the bobbin can move relative to the corresponding opening in the axial direction.

6. The hub rotor assembly of claim 5, wherein each bobbin has an enlarged head connected to the tubular portion that extends beyond edges of the corresponding opening.

7. The hub rotor assembly of claim 2, wherein each fastener includes a nut threaded on the bolt, and the bobbin has a through-hole, wherein the bolt is secured to the bobbin by the nut.

8. The hub rotor assembly of claim 2, wherein the hub has a plurality of slots therein, each slot having a width, and each bobbin has a tubular portion having a width less than the width of each of the slots, wherein each bobbin is retained in a slot so that the bobbin can move relative to the corresponding slot in the radial direction.

9. The hub rotor assembly of claim 2, wherein the rotor has a plurality of openings therein, each opening having a width, and each bobbin has a tubular portion having a width less than the width of each of the openings, wherein each bobbin is retained in an opening so that the bobbin can move relative to the corresponding opening in the radial direction.

10. The hub rotor assembly of claim 2, wherein the bobbin has internal threads and the bolt is threadably engaged with the bobbin.

11. The hub rotor assembly of claim 1, wherein the hub includes a flange with a plurality of openings therein and one of the plurality of fasteners is retained in each opening.

12. The hub rotor assembly of claim 11, wherein the rotor includes a flange with a plurality of openings therein, wherein each opening receives one of the fasteners retained by the openings in the hub.

13. The hub rotor assembly of claim 1, wherein the hub is rotatable and supports the rotor for rotation.

14. The hub rotor assembly of claim 1, in combination with a vehicle having a gross vehicle weight of 5000 pounds or more.

15. A rotor assembly for a vehicle braking system, comprising:
    a rotatable hub;
    a rotor that rotates about a central axis;
    a plurality of fasteners connecting the hub to the rotor so that the rotor is rotated by the hub, wherein each of the fasteners includes a floatation element that allows relative movement between the rotor and the hub in a radial direction and an axial direction with respect to the central axis.

16. The rotor assembly of claim 15, wherein the hub has a plurality of openings therein and the rotor has a plurality of corresponding openings therein, wherein each fastener is retained in one opening in the hub and the corresponding opening the rotor.

17. The rotor assembly of claim 16, wherein the floatation element is a bobbin having a tubular portion that is received within one of the openings in the hub and the rotor.

18. The rotor assembly of claim 17, wherein the opening that receives the bobbin has a width and the tubular portion of the bobbin has an outer width that is less than the width of the opening, wherein a clearance is created between the opening and the bobbin that allows the rotor and the hub to move in the radial direction with respect to each other.

19. The rotor assembly of claim 17, wherein the hub has a thickness adjacent the opening, the rotor has a thickness adjacent the opening, and the tubular portion of the bobbin has a length, wherein the length of the bobbin is greater than the thickness adjacent the opening that receives the bobbin, wherein a clearance is created between the bobbin and the opening that allows the rotor and the hub to move in the axial direction with respect to each other.

20. The rotor assembly of claim 15, wherein the floatation element is a bobbin including a body with a through-hole and an enlarged head, wherein each of the fasteners further includes a bolt received through the through-hole and a nut threadably engaged with the bolt.

21. The rotor assembly of claim 15, wherein the floatation element is a bobbin including a body and an enlarged head, wherein each of the fasteners further includes a bolt threadably received through the bobbin.

22. The rotor assembly of claim 15, in combination with a vehicle having a gross vehicle weight of 5000 pounds or more.

23. A rotor assembly for a heavy duty vehicle braking system, comprising:

a hub having a plurality of openings;

a rotor having a plurality of openings aligned with the openings of the hub; and a plurality of fasteners connecting the hub and the rotor for rotation about a central axis, wherein each fastener is received in one of the aligned openings of the hub and the rotor, and wherein each fastener includes a tubular bobbin with a body and an annular flange extending therefrom and a bolt fastened to the body of the bobbin thereby clamping the rotor to the hub, the body of the bobbin having an outer diameter less than a width of the opening within which the bobbin is retained so that a radial clearance is formed between the body of the bobbin and its respective opening, and the body of the bobbin having a length greater than a thickness of the opening within the bobbin is retained so that an axial clearance is formed between the flange of the bobbin and its respective opening.

* * * * *